United States Patent
Woo et al.

(10) Patent No.: US 8,400,587 B2
(45) Date of Patent: Mar. 19, 2013

(54) LIQUID CRYSTAL DISPLAY DEVICE CAPABLE OF REALIZING BOTH A WIDE VIEWING ANGLE AND A NARROW VIEWING ANGLE

(75) Inventors: Jong Hoon Woo, Bucheon-si (KR); Young Bok Lee, Gunpo-si (KR)

(73) Assignee: LG Display Co., Ltd., Seoul (KR)

( * ) Notice: Subject to any disclaimer, the term of this patent is extended or adjusted under 35 U.S.C. 154(b) by 1109 days.

(21) Appl. No.: 12/003,779

(22) Filed: Dec. 31, 2007

(65) Prior Publication Data
US 2008/0316398 A1 Dec. 25, 2008

(30) Foreign Application Priority Data
Jun. 20, 2007 (KR) .................. 10-2007-0060513

(51) Int. Cl.
G02F 1/1333 (2006.01)
G02F 1/1335 (2006.01)

(52) U.S. Cl. .................. 349/106; 349/110; 349/122

(58) Field of Classification Search .................. 349/122, 349/106, 110
See application file for complete search history.

(56) References Cited

U.S. PATENT DOCUMENTS
6,392,690 B1 * 5/2002 Fujii et al. .................. 348/59
2004/0095521 A1 * 5/2004 Song et al. .................. 349/61
2005/0243253 A1 * 11/2005 Imai et al. .................. 349/122

FOREIGN PATENT DOCUMENTS
JP 11-095167 * 4/1999 .................. 27/22

* cited by examiner

*Primary Examiner* — Lauren Nguyen
(74) *Attorney, Agent, or Firm* — McKenna Long & Aldridge, LLP

(57) ABSTRACT

A liquid crystal display device, in which a plurality of pixels are defined in a matrix form and each pixel includes red, green, blue, and white sub-pixels adjacent to one another vertically and horizontally, is disclosed. The liquid crystal display device includes first, second, and third substrates sequentially stacked from the bottom, a thin-film transistor array formed on the first substrate, a black matrix formed on the second substrate between the first substrate and the second substrate at the boundary of the respective sub-pixels, a color filter layer formed on the second substrate between the first substrate and the second substrate at the respective sub-pixels, and a barrier layer formed on the third substrate over each white sub-pixel. An opening in the white sub-pixel has a smaller size than that of openings in the red, green, and blue sub-pixels. Also, an angle defined between a normal line of the second substrate and a line that connects an edge of the barrier layer with an edge of the black matrix formed below the barrier layer is larger than a value calculated by subtracting 5 degrees from an angle causing the total reflection of light to be passed through the second substrate.

6 Claims, 6 Drawing Sheets

LIQUID CRYSTAL DISPLAY DEVICE CAPABLE OF REALIZING BOTH A WIDE VIEWING ANGLE AND A NARROW VIEWING ANGLE

This application claims the benefit of Korean Patent Application No. P2007-0060513, filed in Korea on Jun. 20, 2007, which is hereby incorporated by reference for all purposes as if fully set forth herein.

BACKGROUND OF THE INVENTION

1. Field of the Invention

The present invention relates to a liquid crystal display device, and more particularly, to a liquid crystal display device capable of realizing both a wide viewing angle and a narrow viewing angle according to a variety of uses thereof.

2. Discussion of the Related Art

With the development of an Information-Society, the demands for display devices are gradually increasing. Recently, in order to satisfy these demands, different varieties of flat-panel display devices including, for example, a liquid crystal display device, a plasma display panel, an electroluminescent display device and a vacuum fluorescent display device, have been researched and introduced. Some of them have already been implemented as display devices for various equipments.

Of the above mentioned display devices, currently, the liquid crystal display device is used the most frequently for portable image display devices and replaces the cathode ray tube (CRT) because of its many advantages thereof including superior image quality, light-weight, thin-thickness and low power consumption. In addition to the portable image display devices such as a monitor for a laptop computer, various ones for use in a television to receive and display broadcasting signals, a monitor for a desktop computer, etc., have been developed.

To implement the liquid crystal display device as a general screen display device in various equipments, high quality images having a high resolution, high brightness, large-area, etc., can be realized while maintaining the essential characteristics of light-weight, thin-thickness, and low power consumption as the key to the development of the liquid crystal display device.

Hereinafter, a related art liquid crystal display device will be described. FIG. 1 is a sectional view illustrating a related art liquid crystal display device.

The related art liquid crystal display device generally includes a liquid crystal panel, and a drive unit to apply a drive signal to the liquid crystal panel. The liquid crystal panel includes a first substrate 10 and a second substrate 20, which are bonded to each other with a predetermined space therebetween, and a liquid crystal layer 30 injected between the first substrate 10 and the second substrate 20.

More specifically, the first substrate 10 includes a plurality of gate lines (not shown) arranged in a direction by a predetermined interval, and a plurality of data lines 14 arranged in a direction perpendicular to the gate lines by a predetermined interval, the gate lines and the data lines 14 defining pixel regions. Each of the pixel regions defined by the gate lines and the data lines 14 is formed with a pixel electrode 17. Also, thin-film transistors (not shown) are formed at intersections of the gate lines and the data lines 14. The thin-film transistors are turned on or off according to scan signals from the gate lines, to apply data signals from the data lines 14 to the respective pixel electrodes 17. This substrate having the above described configuration is called a "thin-film transistor array substrate."

Each of the thin-film transistors includes a gate electrode 1a protruding from the corresponding gate line, a gate insulating layer 12 formed over a surface of the first substrate 10 including the gate electrode 1a, a semiconductor layer 13 formed on the gate insulating layer 12 above the gate electrode 1a, and a source electrode 14a and a drain electrode 15 protruding from the corresponding data line 14 to the semiconductor layer 13, the source electrode 14a and the drain electrode 15 being spaced apart from each other by a predetermined interval.

The second substrate 20 includes a black matrix layer 21 to prevent light from being transmitted onto other regions except for the pixel regions. The second substrate 20 also includes R, G, and B color filter layers 22 to represent red, green, and blue colors, and a common electrode 24 to realize an image. This substrate having the above described configuration is called a "color filter array substrate."

In the above described liquid crystal display device, liquid crystals in the liquid crystal layer 30 between the first substrate 10 and the second substrate 20 are oriented under the influence of an electric field between the pixel electrodes 17 and the common electrode 24. As the amount of light to be transmitted through the liquid crystal layer 30 is adjusted according to the orientation degree of the liquid crystal layer 30, the liquid crystal display device can display an image.

However, when a user tries to make or read a secret document by use of a computer, PDA, etc. using the related art liquid crystal display device, a problem arises in that the related art liquid crystal display device provides only a wide viewing angle and a risk arises of allowing a person other than the user to see the secret document. That is, it is necessary for the liquid crystal display device to realize a narrow viewing angle in view of protecting privacy. The wide viewing angle is useful when several persons look at the liquid crystal display device together.

SUMMARY OF THE INVENTION

Accordingly, the present invention is directed to a liquid crystal display device that substantially obviates one or more problems due to limitations and disadvantages of the related art.

An advantage of the present invention is to provide a liquid crystal display device capable of realizing both a wide viewing angle and a narrow viewing angle according to a variety of uses thereof.

Additional advantages and features of the invention will be set forth in part in the description which follows and will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, a liquid crystal display device, in which a plurality of pixels are defined in a matrix form and each pixel includes red, green, blue, and white sub-pixels adjacent to one another vertically and horizontally, comprises: first, second, and third substrates sequentially stacked from the bottom; a thin-film transistor array formed on the first substrate; a black matrix formed on the second substrate between the first substrate and the second substrate at the boundary of the respective sub-pixels; color filter layers formed on the second substrate between the first substrate and the second substrate at the respective sub-pixels; and a barrier layer formed on the third substrate over each white sub-pixel, wherein an opening in the white sub-pixel has a smaller size than that of openings in the red, green, and blue sub-pixels, and an angle defined between a normal line of the second substrate and a line that connects an edge of the barrier layer with an edge of the black matrix formed below the barrier layer is larger than a value calculated by subtracting 5 degrees from an angle causing the total reflection of light to be passed through the second substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiment(s) of the invention and together with the description serve to explain the principle of the invention.

In the drawings.

DETAILED DESCRIPTION OF THE ILLUSTRATED EMBODIMENTS

Reference will now be made in detail to the embodiments of the present invention, examples of which are illustrated in the accompanying drawings. Wherever possible, the same reference numbers will be used throughout the drawings to refer to the same or like parts.

Figure 1:
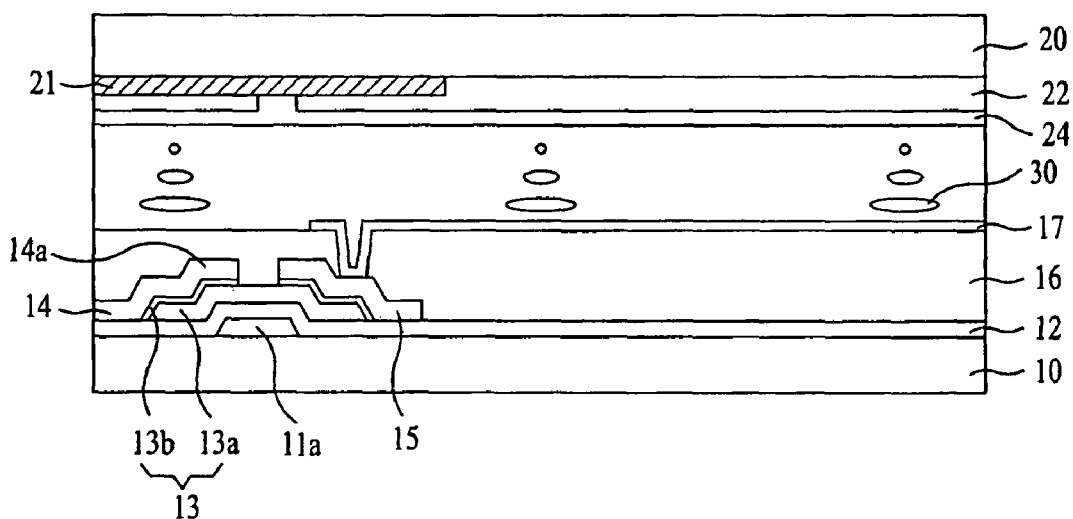
FIG. 1 is a sectional view illustrating a related art liquid crystal display device.
Figure 2:
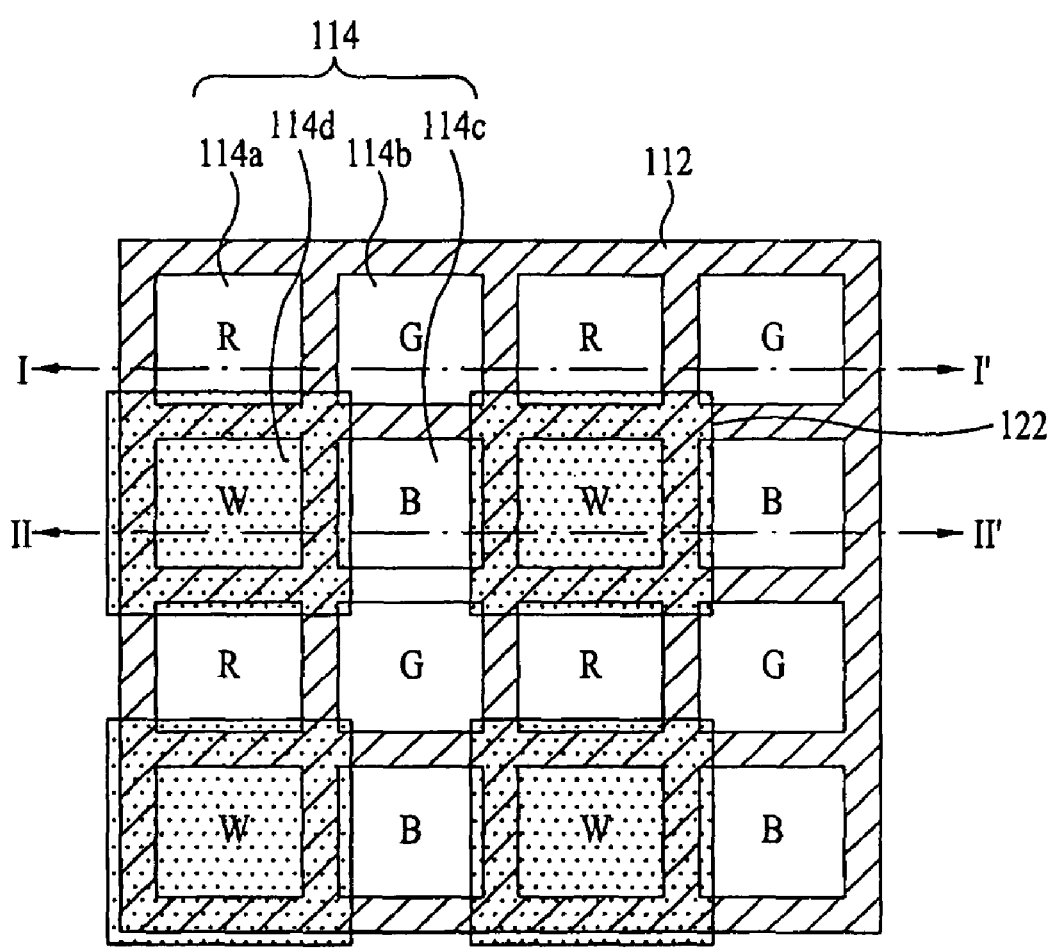
FIG. 2 is a plan view illustrating a liquid crystal display device according to a first embodiment of the present invention.
Figure 3:
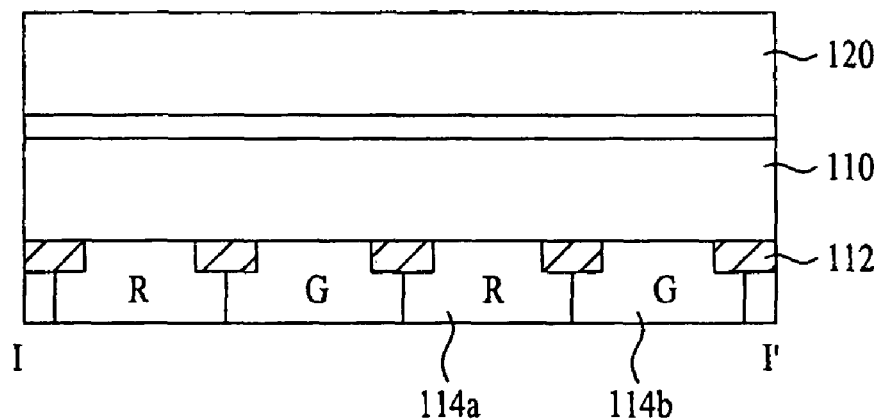
FIG. 3 is a sectional view taken along the line I-I' of FIG. 2, illustrating the liquid crystal display device according to the first embodiment of the present invention.
Figure 4:
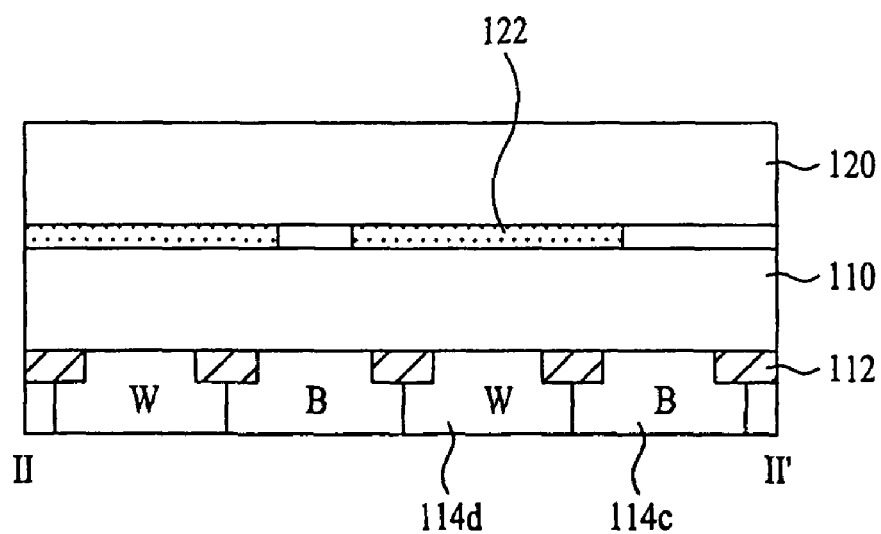
FIG. 4 is a sectional view taken along the line II-II' of FIG. 2, illustrating the liquid crystal display device according to the first embodiment of the present invention.

FIG. 2 is a plan view illustrating a liquid crystal display device according to a first embodiment of the present invention. Also, FIG. 3 is a sectional view taken along the line I-I' of FIG. 2, and FIG. 4 is a sectional view taken along the line II-II' of FIG. 2, illustrating the liquid crystal display device according to the first embodiment of the present invention.

The liquid crystal display device according to the first embodiment of the present invention is configured such that a plurality of pixels are defined in a matrix form, and each pixel includes red, green, blue, and white sub-pixels arranged adjacent to one another vertically and horizontally. The liquid crystal display device includes a first substrate (not shown), a second substrate 110, and a third substrate 120, which are stacked in this sequence from the bottom. The liquid crystal display device further includes a thin-film transistor array (not shown) formed on the first substrate, a black matrix 112 formed on the second substrate 110 between the first substrate and the second substrate 110 at the boundary of the respective sub-pixels, color filter layers 114a, 114b, 114c, and 114d formed on the second substrate 110 between the first substrate and the second substrate 110 at the respective sub-pixels, and a barrier layer 122 formed on the third substrate 120 at the overall region of each white sub-pixel and partial regions of the red, green, and blue sub-pixels adjacent to the white sub-pixel.

Here, a single pixel includes four sub-pixels, and the four sub-pixels include a red sub-pixel, a green sub-pixel, a blue sub-pixel, and a white sub-pixel.

The previously described related art liquid crystal display device includes red, green, and blue sub-pixels. On the other hand, the liquid crystal display device according to the first embodiment of the present invention further includes the white sub-pixel to constitute the single pixel.

Although not shown, the thin-film transistor array includes a plurality of gate lines and data lines arranged on the first substrate by a predetermined interval, the gate lines and data lines extending in different directions perpendicular to each other, thin-film transistors formed at intersections of the gate lines and the data lines, and pixel electrodes formed at the respective sub-pixels and connected with the thin-film transistors.

The black matrix 112 can be formed at the boundary of the respective sub-pixels in such a manner that a resin as a photosensitive black organic material is applied to form a resin layer and the resin layer is patterned by photo-processes (including exposure and developing processes). In this case, the resin layer may be classified into a positive type in which a light receiving region is developed, and a negative type in which a region except for a light receiving region is developed.

Alternatively, the black matrix 112 can be formed by performing a photo-process and an etching process on an impermeable metal such as chrome (Cr) or other suitable material. However, when the black matrix 112 is made of a resin other than chrome (Cr), it is possible to eliminate an etching process after performing a developing process, and the black matrix 112 can be formed in a more simplified manner.

The color filter layers 114 include a red color filter layer 114a, a green color filter layer 114b, a blue color filter layer 114c, and a white color filter layer 114d, which correspond to the red, green, blue, and white sub-pixels, respectively. In the present embodiment, the red and green color filter layers 114a and 114b are formed, respectively, in upper left and right positions of a single pixel, and the blue and white color filter layers 114c and 114d are formed, respectively, in lower right and left positions of the single pixel.

The respective color filter layers 114 serve as light filtering elements. Specifically, the red color filter layer 114a transmits only a red light component of white light and absorbs the other light components. Similarly, the green color filter layer 114b transmits only a green light component, the blue color filter layer 114c transmits only a blue light component, and the white color filter layer 114d transmits all light components.

The barrier layer 122 is formed on the third substrate 120, to correspond to the overall region of each white sub-pixel and partial regions of the red, green, and blue sub-pixels adjacent to the white sub-pixel. The barrier layer 122 prevents light from being emitted to the front side of the liquid crystal display device, and is made of a light shielding material, for example, chrome (Cr), molybdenum (Mo), or a resin as a photosensitive black organic material may be used to form the barrier layer 122.

The above described liquid crystal display device according to the first embodiment of the present invention is designed to realize both a wide viewing angle and a narrow viewing angle. In a wide viewing angle mode, the thin-film transistors of the white sub-pixels are turned off, such that all light components emitted from the red, green, and blue sub-pixels can be recognized even at left and right viewing angles as well as a front viewing angle.

On the other hand, in a narrow viewing angle mode, the thin-film transistors of the white sub-pixels are turned on, and the barrier layer 122 prevents light from being emitted from the white sub-pixels to the front side of the liquid crystal display device. Therefore, although all light components emitted from the red, green, and blue sub-pixels can be accurately recognized, these red, green, and blue light components experience a degradation in visibility under the condition of left and right viewing angles because of light emitted from the white sub-pixels. In other words, an observer can accurately recognize a screen when viewing the liquid crystal display device from the front side thereof, but cannot recognize the screen when viewing the liquid crystal display device at left and right viewing angles.

Assuming that the barrier layer 122 is formed to correspond to only the white sub-pixels, when the white sub-pixels are turned on, there is a risk that an observer who views the liquid crystal display device from the front side thereof suffers from a light leakage phenomenon because of light emitted from the white sub-pixels by a predetermined angle. This results in a degradation in visibility at a front viewing angle. For this reason, the barrier layer 122 must be formed even in the partial regions of the red, green, and blue sub-pixels adjacent to each white sub-pixel.

However, the liquid crystal display device according to the first embodiment of the present invention may experience the following problem.

Figure 5:
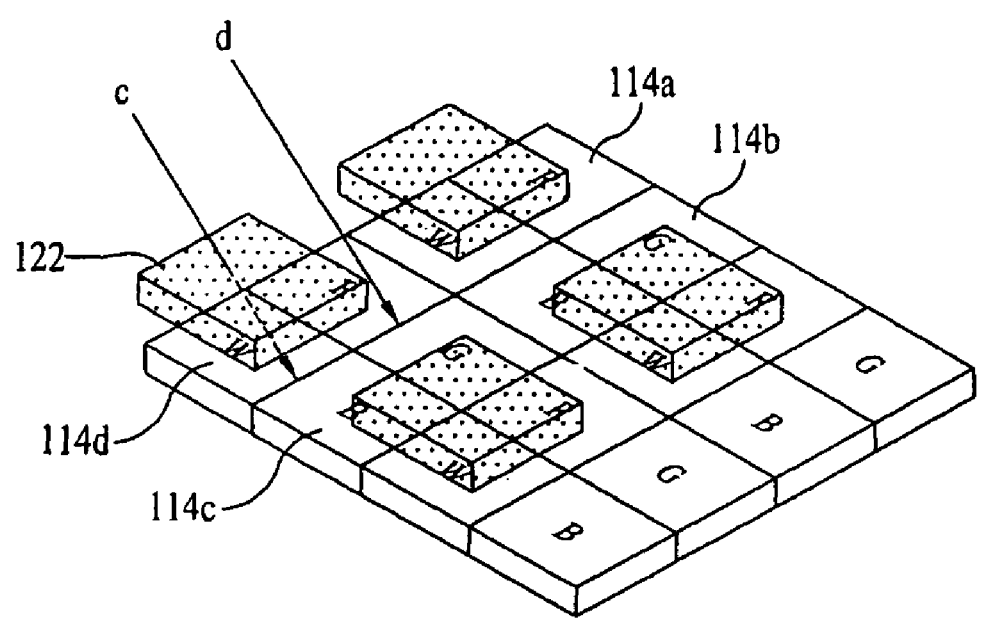
FIG. 5 is a view illustrating a problem to be resolved by the liquid crystal display device according to the first embodiment of the present invention.

FIG. 5 is a view illustrating a problem to be resolved by the liquid crystal display device according to the first embodiment of the present invention. In FIG. 5, an illustration of the black matrix and the second and third substrates is omitted.

As shown in FIG. 5, when forming the barrier layer 122 on the white color filter layer 114d such that the barrier layer 122 corresponds to the overall region of each white sub-pixel and partial regions of the red, green, and blue sub-pixels adjacent to the white sub-pixel, there occurs a color shift phenomenon representing a specific color in a predetermined viewing region (at a predetermined viewing angle or more).

Specifically, when viewing the panel from a left viewing angle along the arrow "d" as shown, the green sub-pixel can be seen. However, when viewing along the arrow "c", the blue sub-pixel is obstructed by the barrier layer 122 and cannot be seen.

Accordingly, with the above described configuration of the barrier layer 122, the barrier layer 122 has a difference in the shielding efficiency of different light components emitted from the red, green, and blue sub-pixels, and may make it difficult for the liquid crystal display device to accurately display a desired image.

Hereinafter, a liquid crystal display device according to a second embodiment of the present invention to solve the above described problem will be described.

Figure 6:
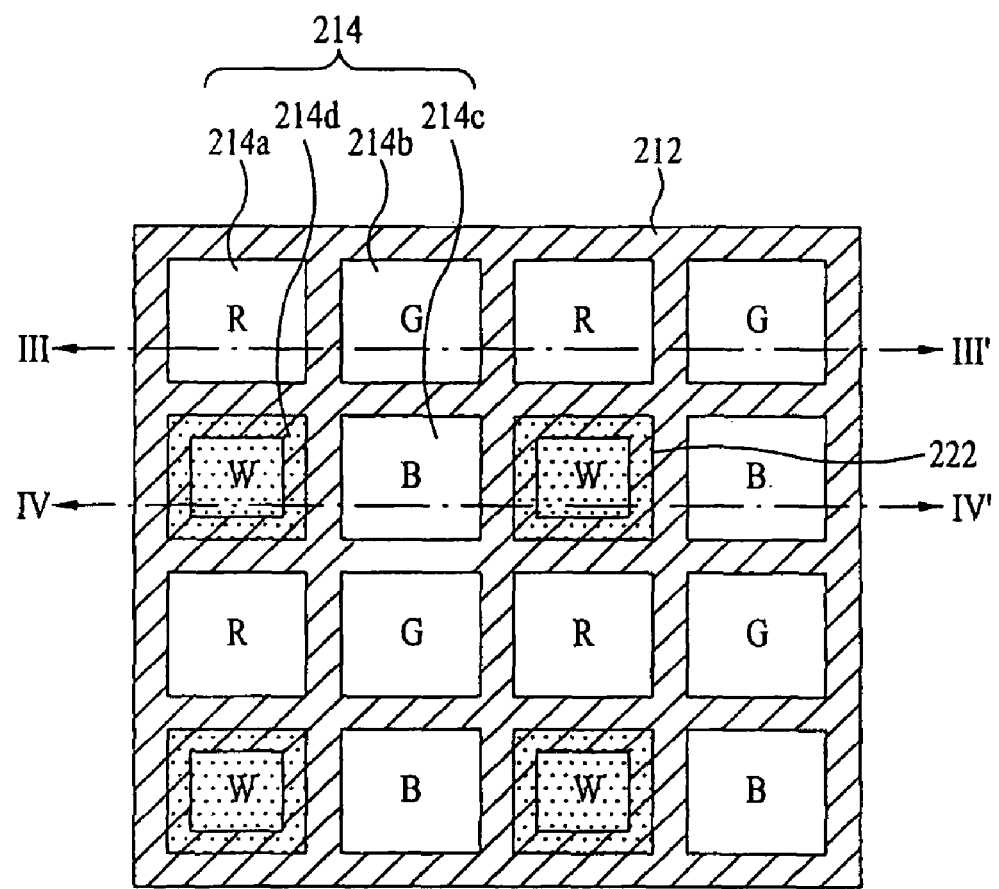
FIG. 6 is a plan view illustrating a liquid crystal display device according to a second embodiment of the present invention.
Figure 7:
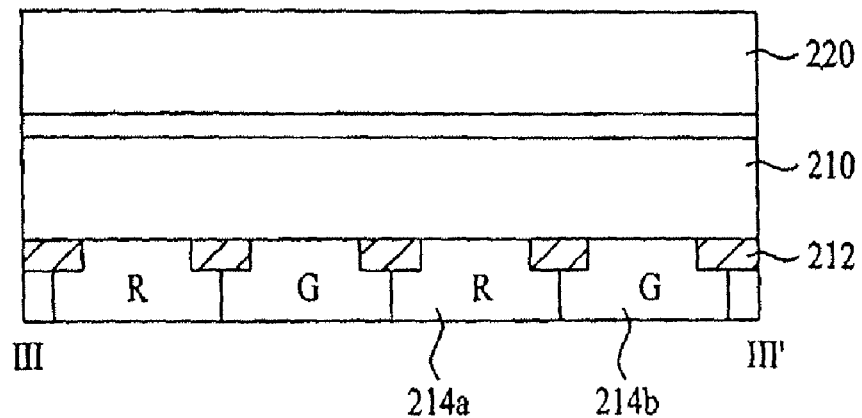
FIG. 7 is a sectional view taken along the line III-III' of FIG. 6, illustrating the liquid crystal display device according to the second embodiment of the present invention.
Figure 8:
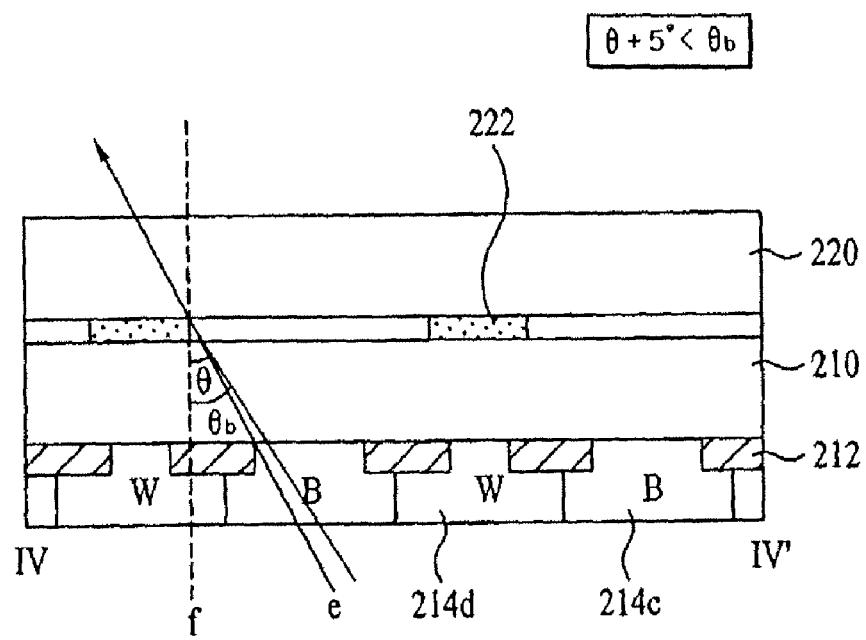
FIG. 8 is a sectional view taken along the line IV-IV' of FIG. 6, illustrating the liquid crystal display device according to the second embodiment of the present invention.

FIG. 6 is a plan view illustrating a liquid crystal display device according to a second embodiment of the present invention. FIG. 7 is a sectional view taken along the line III-III' of FIG. 6, and FIG. 8 is a sectional view taken along the line IV-IV' of FIG. 6, illustrating the liquid crystal display device according to the second embodiment of the present invention.

Similar to that of the previously described first embodiment, the liquid crystal display device according to the second embodiment of the present invention is configured such that a plurality of pixels are defined in a matrix form, and each pixel includes red, green, blue, and white sub-pixels arranged adjacent to one another vertically and horizontally. The liquid crystal display device includes a first substrate (not shown), a second substrate 210, and a third substrate 220, which are stacked in this sequence from the bottom. The liquid crystal display device further includes a thin-film transistor array (not shown) formed on the first substrate, a black matrix 212 formed on the second substrate 210 between the first substrate and the second substrate 210 at the boundary of the respective sub-pixels, color filter layers 214a, 214b, 214c, and 214d formed on the second substrate 210 between the first substrate and the second substrate 210 at the respective sub-pixels, and a barrier layer 222 formed on the third substrate 220 over each white sub-pixel.

The present embodiment has features in that, an opening in the white sub-pixel has a smaller size than that of openings in the red, green and blue sub-pixels, and in that an angle θb defined between a normal line f of the second substrate 220 and light to be passed through the second substrate 210 is larger than a value calculated by subtracting 5 degrees from an angle causing the total reflection of light to be passed through the second substrate 210. An angle θ defined between a normal line f of the second substrate 220 and a line e that connects an edge of the barrier layer 222 with an edge of the black matrix 212 formed below the barrier layer 222 is angle causing the total reflection of light to be passed through the second substrate.

Here, a single pixel includes four sub-pixels, and the four sub-pixels include a red sub-pixel, a green sub-pixel, a blue sub-pixel, and a white sub-pixel.

The previously described related art liquid crystal display device includes red, green, and blue sub-pixels. On the other hand, the liquid crystal display device according to the second embodiment of the present invention further includes the white sub-pixel to constitute the single pixel.

A description of the thin-film transistor array, black matrix 212, and color filter layers 214 is identical to that of the previously described first embodiment, and will be omitted hereinafter.

In the present embodiment, the barrier layer 222 serves to obstruct light to be emitted to the front side of the liquid crystal display device, and is made of a light shielding material, for example, chrome (Cr), molybdenum (Mo), or a resin as a photosensitive black organic material may be used to form the barrier layer 222.

Different from the first embodiment, in the second embodiment of the present invention, the barrier layer 222 is formed to correspond to only each white sub-pixel, rather than being formed in the overall region of the white sub-pixel and partial regions of the red, green, and blue sub-pixels.

In this case, the width of the black matrix 212 around the white sub-pixel is greater than the width of the black matrix 212 around the other sub-pixels (i.e. the red, green, and blue sub-pixels). As a result, the size of the opening in the white sub-pixel can be reduced as compared to the size of the openings in the red, green, and blue sub-pixels.

The barrier layer 222 is formed so as to be overlapped with the black matrix 212 formed around the white sub-pixel.

In the first embodiment, when viewing the liquid crystal display device from a side viewing angle, light emitted from the blue sub-pixel is obstructed by the barrier layer, resulting in a color shift phenomenon. On the other hand, in the second embodiment, the black matrix 212 around the white sub-pixel has a greater width than that of the remaining region thereof. Such a greater width of the black matrix 212 around the white sub-pixel allows the barrier layer 222 above the white sub-pixel to have a reduced width, and consequently, eliminates a risk in that the barrier layer 222 obstructs light emitted from the blue sub-pixel.

Here, the angle θ is an angle causing the total reflection of light to be passed through the second substrate 210. The angle θ is calculated by the following Equation 1.

$$n_1 \sin \theta_1 = n_2 \sin \theta_2$$ Equation 1

(where, $n_1$: refractive index of glass=1.51, $n_2$: refractive index of air=1.00, $\theta_2$: total reflection angle=90 degrees)

$$\theta_1 = \sin^{-1}\left(\frac{1.00}{1.51}\right) = 41.47°$$

Here, the reason why the refractive index of glass as $n_1$ is used is because the second substrate 210 is made of glass. Also, the reason why the refractive index of air as $n_2$ is used is because an air layer is created between the second substrate 210 and the third substrate 220.

Accordingly, if incident light has an angle of 41.47 degrees or more with the line "f", the incident light is totally reflected rather than being obstructed by the barrier layer 222. That is, even if there is no barrier layer 222, the incident light does not pass through the second substrate 210 and is totally reflected.

Similar to the first embodiment, the liquid crystal display device according to the second embodiment of the present invention can realize both a wide viewing angle and a narrow viewing angle by turning on or off the thin-film transistors in the white sub-pixels.

Although the above described embodiments of the present invention exemplify that the red sub-pixel, green sub-pixel, blue sub-pixel, and white sub-pixel are arranged clockwise in this sequence, the protective range of the present invention is not limited thereto, and the sequence of the sub-pixels can be changed.

As apparent from the above description, a liquid crystal display device according to the present invention has the following effects.

Firstly, a single pixel includes red, green, blue, and white sub-pixels arranged adjacent to one another vertically and horizontally. With this arrangement, by turning on or off thin-film transistors of the white sub-pixel, the liquid crystal display device can realize both a wide viewing angle and a narrow viewing angle according to a variety of uses thereof.

Secondly, according to the present invention, an opening in the white sub-pixel has a smaller size than that of openings in the red, green and blue sub-pixels, and an angle defined between a normal line of a second substrate and a line that connects an edge of a barrier layer with an edge of a black matrix formed below the barrier layer is larger than a value calculated by subtracting 5 degrees from an angle causing the total reflection of light to be passed through the second substrate. As a result, it is possible to prevent light emitted from regions of the sub-pixels horizontally adjacent to the white sub-pixel from being obstructed by the barrier layer. Thus, a color shift phenomenon may be eliminated.

Thirdly, by reducing the width of the barrier layer as compared to the related art, the present invention has the effect of improving the overall brightness of the liquid crystal display device.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A liquid crystal display device, in which a plurality of pixels are defined in a matrix form and each pixel includes red, green, blue, and white sub-pixels adjacent to one another vertically and horizontally, comprising:
   first, second, and third substrates sequentially stacked from the bottom;
   a thin-film transistor array formed on the first substrate;
   a black matrix formed on the second substrate between the first substrate and the second substrate at the boundary of the respective sub-pixels;
   color filter layers formed on the second substrate between the first substrate and the second substrate at the respective sub-pixels; and
   a barrier layer formed on the third substrate over each white sub-pixel,
   wherein an opening in the white sub-pixel has a smaller size than that of openings in the red, green, and blue sub-pixels;
   wherein an angle defined between a normal line of the second substrate and light to be passed through the second substrate is larger than a value calculated by subtracting 5 degrees from an angle causing the total reflection of light to be passed through the second substrate;
   wherein an angle defined between the normal line of the second substrate and a line e that connects an edge of the barrier layer with an edge of the black matrix formed below the barrier layer is the angle causing the total reflection of light to be passed through the second substrate;
   wherein the barrier layer formed on the third substrate in the white sub-pixel and width of the barrier layer is narrower than width of the white sub-pixel; and
   wherein the white sub-pixel is turned on in a narrow viewing angle mode, and the barrier layer prevents light from being emitted from the white sub-pixel to the front side of the liquid crystal display device, allows light emitted from the white sub-pixel to left and right side of the liquid crystal display device to disturb light from the red, green and blue sub-pixels, and the white sub-pixel is turned off in a wide viewing angle mode.

2. The liquid crystal display device according to claim 1, wherein the barrier layer is made of a light-shielding material.

3. The liquid crystal display device according to claim 2, wherein the light-shielding material is chrome (Cr), molybdenum (Mo), or a resin as a photosensitive black organic material.

4. The liquid crystal display device according to claim 1, wherein the barrier layer is overlapped with the black matrix formed around the white sub-pixel.

5. The liquid crystal display device according to claim 1, wherein a width of the black matrix around the white sub-pixel is greater than the width of the black matrix around the red, green, and blue sub-pixels, such that the opening in the white sub-pixel has a smaller size than the size of openings in the red, green, and blue sub-pixels.

6. The liquid crystal display device according to claim 1, wherein the second substrate is made of glass, and wherein the angle causing the total reflection of light to be passed through the second substrate is 41.47 degrees.

* * * * *